United States Patent
Mortgat

(10) Patent No.: US 7,118,322 B2
(45) Date of Patent: Oct. 10, 2006

(54) DEVICE FOR INJECTING COOLING AIR INTO A TURBINE ROTOR

(75) Inventor: Didier Mortgat, Combs la Ville (FR)

(73) Assignee: Snecma Moteurs, Paris (FR)

( * ) Notice: Subject to any disclaimer, the term of this patent is extended or adjusted under 35 U.S.C. 154(b) by 120 days.

(21) Appl. No.: 10/801,599

(22) Filed: Mar. 17, 2004

(65) Prior Publication Data

US 2005/0008480 A1    Jan. 13, 2005

(30) Foreign Application Priority Data

Mar. 25, 2003   (FR) .................................. 03 03600

(51) Int. Cl.
F01D 17/14   (2006.01)

(52) U.S. Cl. ........................ 415/12; 415/191
(58) Field of Classification Search ................. 415/12, 415/116, 191, 211.2
See application file for complete search history.

(56) References Cited

U.S. PATENT DOCUMENTS

| | | | |
|---|---|---|---|
| 3,038,698 A | 6/1962 | Troyer | |
| 3,042,371 A | 7/1962 | Fanti | |
| 4,619,580 A * | 10/1986 | Snyder | 415/12 |
| 5,133,643 A * | 7/1992 | Ortolano | 416/195 |
| 5,207,558 A * | 5/1993 | Hagle et al. | 415/161 |

FOREIGN PATENT DOCUMENTS

| | | |
|---|---|---|
| DE | 961 742 | 4/1957 |
| GB | 2 019 793 | 11/1979 |
| GB | 2 372 296 | 8/2002 |

* cited by examiner

Primary Examiner—Edward K. Look
Assistant Examiner—Devin Hanan
(74) Attorney, Agent, or Firm—Oblon, Spivak, McClelland, Maier & Neustadt, P.C.

(57) ABSTRACT

A device for injecting cooling air into a turbo-machine turbine rotor includes a plurality of injectors distributed regularly around a longitudinal axis of the turbomachine and mounted between an inner shroud and an outer shroud. Each injector has a bimetallic structure with a first metal material forming a major portion of the structure of the injector and having a first coefficient of thermal expansion, and a second metal material forming a complementary portion of the structure in the vicinity of the suction side wall meeting the trailing edge of the injector, and having a second coefficient of thermal expansion that is smaller than the first.

20 Claims, 3 Drawing Sheets

DEVICE FOR INJECTING COOLING AIR INTO A TURBINE ROTOR

FIELD OF THE INVENTION

The present invention relates in general to systems for injecting cooling air into airplane turbomachines, and it relates more particularly to optimizing the feed of cooling air to a turbine rotor.

PRIOR ART

A conventional system for injecting cooling air into a turbine rotor of an airplane turbomachine is shown diagrammatically in FIG. 7. The rotor 40 has through orifices 42 regularly distributed around a longitudinal axis 44 of the turbomachine and through which cooling air is injected. The cooling air comes from a flow of cooling air 46 taken from around the combustion chamber 48, for example, and it is injected from stationary injectors 50 distributed circumferentially around the longitudinal axis, with the mean radius of the injectors corresponding to the mean radius of the through orifices of the rotor so that the injectors face the orifices. The injection flow that serves to cool the turbine blades 52 and also the rotor disk 54 and the labyrinth 56 also serves to perform purging upstream from these blades and the flow rate is calibrated by the section of the aerodynamic throats of the injectors, which section remains constant in all stages of flight, its dimension being determined as a function of the most serve operating conditions for the turbomachine, which generally occur while taking off with a damaged engine.

Thus, the injection flow rate is not optimized in any way during cruising flight, for example, and there are therefore major aerodynamic losses associated with reintroducing excess cooling air both into the turbine blades and for the upstream purging.

It is known to remedy this problem by introducing a flow rate regulator device upstream from the injectors, as disclosed in French patent application FR 2 500 534, or by making the injectors as a plurality of parts, one of which can be controlled by a valve actuated by the pressure of the air, as taught in British patent application GB 2 246 836.

Unfortunately, those solutions do not appear to be satisfactory since by adding mass to the engine (pipework, valves, etc.) they limit the performance of the turbomachine, and by making its equipment more complex (regulation) they limit reliability, and by adding components they increase costs.

In addition, those solutions do not enable optimized aerodynamics to be conserved for all stages of flight, and in particular during the main or cruising stage.

OBJECT AND DEFINITION OF THE INVENTION

Thus, an object of the present invention is to provide a device for injecting cooling air into a turbomachine turbine rotor that provides high performance, is reliable, and inexpensive compared with prior art devices, and in particular that presents weight and costs that are reduced compared with those prior art devices. An object of the invention is also to conserve optimized aerodynamics even when not operating at maximum flow rate, thereby minimizing turbine efficiency losses, in particular during cruising flight.

These objects are achieved by a device for injecting cooling air into a turbomachine turbine rotor, the device comprising a plurality of injectors distributed regularly around a longitudinal axis of the turbomachine and mounted between an inner shroud and an outer shroud, each injector of aerodynamic profile comprising, between a leading edge and a trailing edge, a suction side wall and a pressure side wall, the cooling air passing through the injectors being ejected towards through orifices in the turbine rotor via a flow section forming an aerodynamic throat between the trailing edge of one injector and the suction side wall of an immediately adjacent injector, wherein, in order to modify the section of the aerodynamic throat as a function of the temperature of the cooling air passing through the injectors, each injector comprises a bimetallic structure with a first metal material forming a major portion of the structure of the injector and having a first coefficient of thermal expansion, and a second metal material forming a complementary portion of the structure in the vicinity of the suction side wall meeting the trailing edge of the injector, and having a second coefficient of thermal expansion that is smaller than the first.

Thus, this configuration which is simple to make and install does not add weight to the engine and presents operation that is particularly reliable since it is entirely passive.

Preferably, said first and second metal materials are assembled together by welding or brazing.

Advantageously, said first metal material is selected from nickel-based alloys and said second metal material is selected from nickel- or titanium-based alloys.

In an alternative embodiment, each injector may comprise a metal structure with shape memory.

Each injector is fixed to the inner and outer shrouds by a bolted connection so as to ensure a precise setting angle and each injector presents reduced height over a determined length adjacent to its trailing edge so as to leave the aerodynamic throat free to expand.

BRIEF DESCRIPTION OF THE DRAWINGS

The characteristics and advantages of the present invention will appear better on reading the following description given by way of non-limiting indication and made with reference to the accompanying drawings, in which.

DETAILED DESCRIPTION OF A PREFERRED EMBODIMENT

It is known that the flying speed of an airplane has an influence on the temperature of the air passing through the turbomachine. In particular, the temperature difference between takeoff and cruising is typically 100 Kelvins (K) to 200 K at the injectors feeding the moving blades. The inventors have taken advantage of this characteristic by proposing injectors having an aerodynamic profile that varies with temperature, thus enabling the turbine rotor to be overventilated on takeoff, to be ventilated exactly right during cruising, and to be ventilated at the strict minimum while idling.

Figure 1:
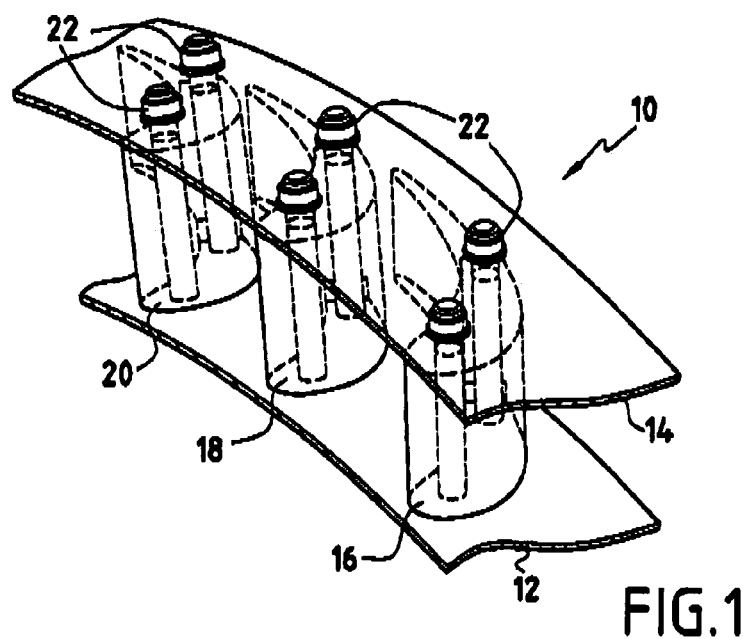
FIG. 1 is a fragmentary perspective view of a cooling air injection device of the present invention.

A device of the invention for injecting cooling air into the rotor of a turbomachine turbine is shown diagrammatically in a fragmentary perspective view in FIG. 1.

The device 10 comprises an inner shroud 12 and an outer shroud 14, together with a plurality of injectors 16, 18, 20 regularly distributed about a longitudinal axis of the turbomachine and each in the same determined position corresponding to a precise setting angle, being secured by fixing means, e.g. two bolted connections 22.

Each injector presents an aerodynamic profile for properly guiding the cooling air, having a rounded upstream end referred to as the leading edge 24 suitable for accommodating variations in the angle of incidence in the flow, a narrow downstream portion referred to as the trailing edge 26 for reducing wake, and between these two edges, a suction side wall 28 and a pressure side wall 30.

In the invention, each injector presents a structure of material that enables the section of the aerodynamic throat to be varied as a function of temperature. Depending on the intended embodiment, the injectors can be made of a material having shape memory, or more simply out of a plurality of materials, advantageously two materials, having different coefficients of thermal expansion.

Figure 2:
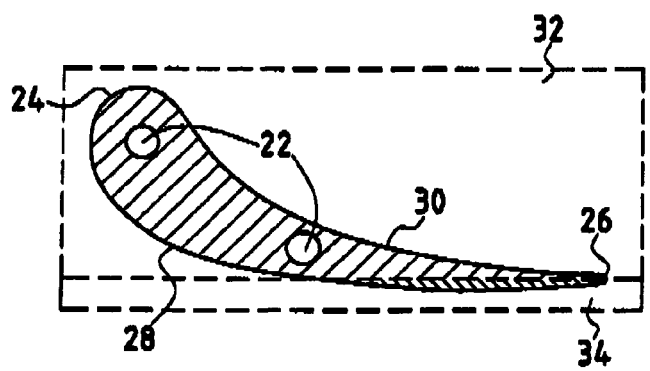
FIG. 2 shows a bimetallic injector structure specially adapted to the FIG. 1 device.

FIG. 2 shows the structure of a bimetallic strip type made up of two different metals. The first strip 32 forming the major portion of the structure of the injector is selected from nickel-based alloys, e.g. NC22FeD presenting a first coefficient of thermal expansion equal to $15.5 \times 10^{-6}$ per degree Celsius ($° C.^{-1}$) and the second strip 34 which occupies only the remaining portion of said structure in the vicinity of the suction side wall 28 terminating at the trailing edge 26 is made of an alloy based on titanium or on nickel and having a coefficient of thermal expansion that is smaller than that of the first strip, for example it is made of Ti presenting a second coefficient of thermal expansion equal to $11 \times 10^{-6 °}$ $C.^{-1}$. The first material has two holes for receiving the bolt connections 22. The above-described structure can be made conventionally by electroerosion (cut out with a wire), by laser cutting, or by indeed by being cut out with a jet of water, from a slab of these two materials that have previously been assembled together by diffusion welding, by friction welding, or by brazing, depending on the type of material used.

Figure 3:
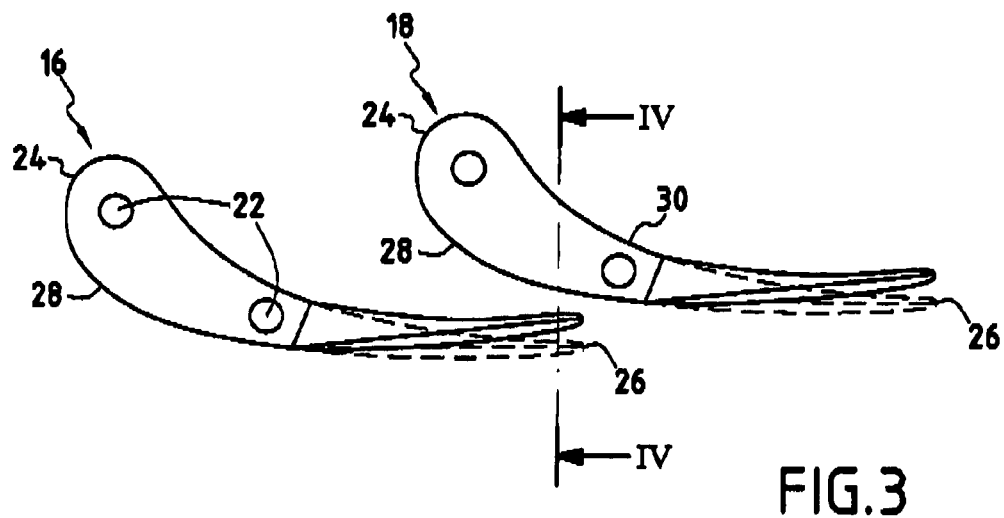
FIG. 3 shows how the aerodynamic throats of the injectors of the FIG. 1 device expand.
Figure 4A:
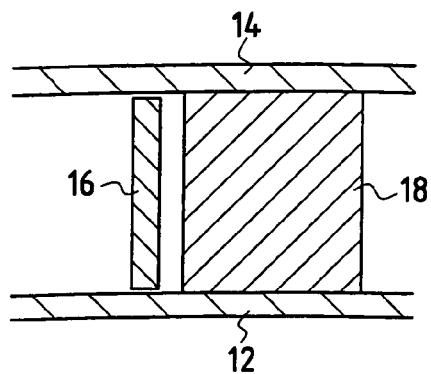
FIGS. 4A to 4C are sections on IV—IV of FIG. 3 showing three different positions of the aerodynamic throat of an injector.
Figure 4B:
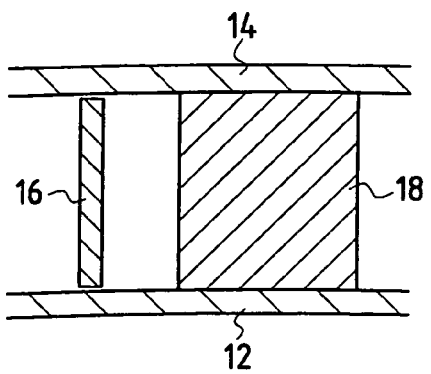
Figure 4C:
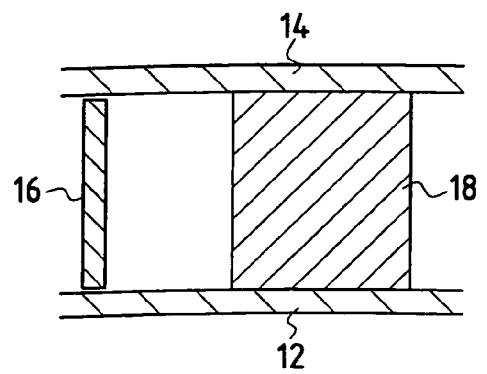

The operation of the injection device is described below with reference to FIGS. 3 to 5. FIG. 3 shows the effect of temperature on two injectors (e.g. 16 and 18) at two different temperatures, the dashed lines showing a position for the injectors at a high temperature, e.g. a position corresponding to takeoff or climbing to cruising altitude. It may be observed that in this position the section of the aerodynamic throat of the injectors is greater than the section corresponding to the continuous lines which correspond to a lower temperature, e.g. the rest temperature of the injectors (when cold). FIGS. 4A to 4C show three characteristic positions for this section of the aerodynamic throat. FIG. 4A corresponds to the smallest section relating to the turbomachine at rest (or while idling). FIG. 4B corresponds to a larger section, e.g. relating to cruising flight, and FIG. 4C corresponds to the maximum throat section, e.g. during takeoff.

A suitable selection of the two materials and of the aerodynamic profile of the injectors thus makes it possible to adjust the aperture (expansion) of the aerodynamic throat so as to overventilate the turbine rotor during takeoff without heeding overconsumption (thereby enabling the lifetime of the rotor to be increased), to ventilate by exactly the right amount during cruising so as to optimize fuel consumption, and to ventilate with the strict minimum when operating at lower temperatures, such as when idling. This matching of the cooling air flow rate (which can also be referred as the ventilation flow rate) to requirements makes it possible to achieve an appreciable saving in specific consumption, particularly because consumption is reduced during cruising which has the greatest influence on the aerodynamic performance of the turbomachine.

Figure 5:
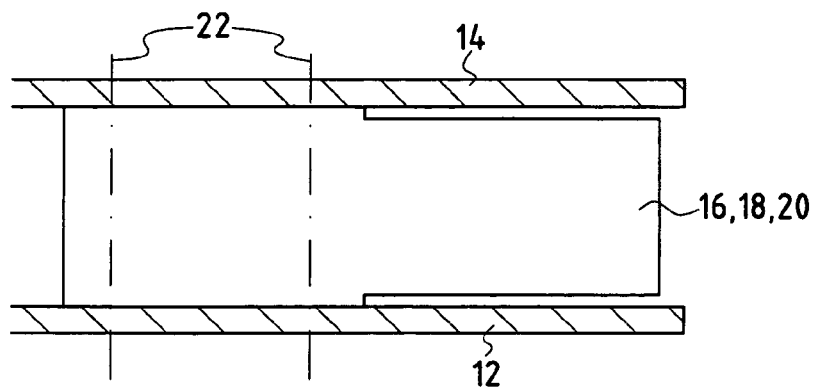
FIG. 5 is a section of an injector.

Naturally, in order to allow the aerodynamic throat to expand freely, and as shown in FIG. 5, the injectors are of reduced height over a determined length (corresponding substantially to the position of the second metal material) beside their trailing edges 26 so as to guarantee some minimum amount of clearance relative to the inner and outer shrouds, thereby leaving the aero-dynamic throat free to expand.

Figure 6:
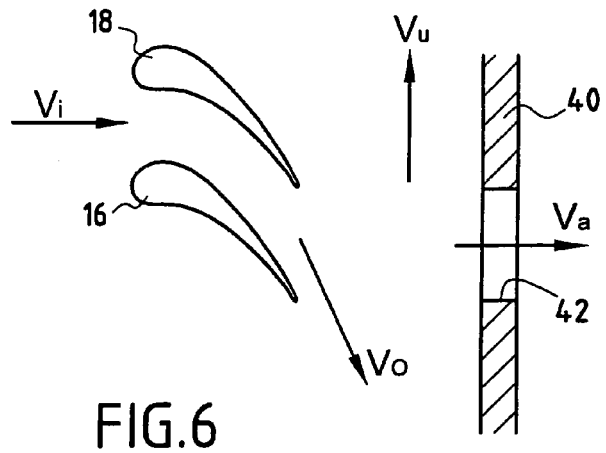
FIG. 6 is a diagram showing the flow of cooling air through the through orifices of the turbine rotor.
Figure 7:
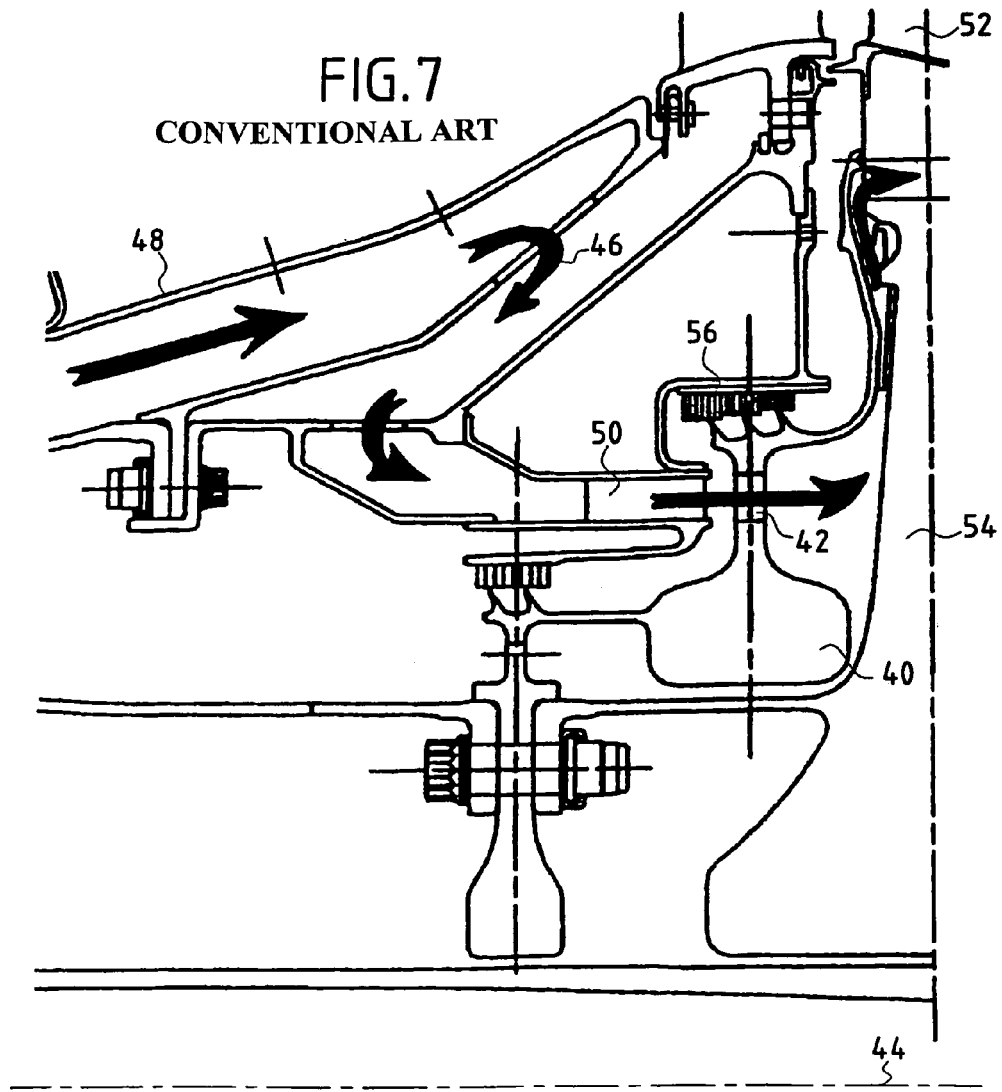
FIG. 7 is a fragmentary diagrammatic view of a turbomachine showing a prior art device for injecting cooling air into a turbine rotor.

Thus, with the invention, the ejection velocity Vo of the air at the outlet from the injectors (resulting from the axial flow velocity Vi at the inlet to the injectors) remains sufficient to ensure optimized passage through the through orifices 42 in the turbine rotor 40, i.e. taking account of the drive velocity Vu of the rotor with a feed velocity Va that is always directed in the initial axial direction (see FIG. 6). The initial air flow that has been deflected by the injectors is thus rectified by the effect of the rotor rotating.

What is claimed is:

1. A device for injecting cooling air into a turbomachine turbine rotor, the device comprising a plurality of injectors distributed regularly around a longitudinal axis of the turbomachine and mounted between an inner shroud and an outer shroud, each injector of aerodynamic profile comprising, between a leading edge and a trailing edge, a suction side wall and a pressure side wall, the cooling air passing through the injectors being ejected towards through orifices in the turbine rotor via a flow section forming an aerodynamic throat between the trailing edge of one injector and the suction side wall of an immediately adjacent injector, wherein, in order to modify the section of the aerodynamic throat as a function of the temperature of the cooling air passing through the injectors, each injector comprises a bimetallic structure with a first metal material forming a major portion of the structure of the injector and having a first coefficient of thermal expansion, and a second metal material forming a complementary portion of the structure in the vicinity of the suction side wall meeting the trailing edge of the injector, and having a second coefficient of thermal expansion that is smaller than the first wherein a leading edge portion of the bimetallic structure is free of said second material.

2. The device for injecting cooling air according to claim 1, wherein said first and second metal materials are assembled together by welding or brazing.

3. The cooling air injection device according to claim 1, wherein said first metal material is selected from nickel-based alloys.

4. The cooling air injection device according to claim 1, wherein said second metal material is selected from nickel- or titanium-based alloys.

5. The cooling air injection device according to claim 1, wherein each injector is fixed to the inner and outer shrouds by a bolted connection so as to ensure a precise setting angle.

6. The cooling air injection device according to claim 1, wherein each injector presents reduced height over a length adjacent to its trailing edge so as to leave the aerodynamic throat free to expand.

7. A device for injecting cooling air into a turbomachine turbine rotor comprising:
   a plurality of injectors distributed regularly around a longitudinal axis of the turbomachine and mounted between an inner shroud and an outer shroud, each injector of aerodynamic profile including, between a leading edge and a trailing edge,
   a suction side wall, and
   a pressure side wall,
   the cooling air passing through the injectors being ejected towards through orifices in the turbine rotor via a flow section forming an aerodynamic throat between the trailing edge of one injector and the suction side wall of an immediately adjacent injector,
   wherein each injector comprises,
      a leading edge portion including a first metal material having a first coefficient of thermal expansion, and
      a trailing edge portion including the first material and a second metal material forming a complementary portion on a suction side of the injector, said second material having a second coefficient of thermal expansion that is smaller than the first,
   wherein said leading edge portion is free of said second metal material.

8. The device for injecting cooling air according to claim 7, wherein said first and second metal materials are assembled together by welding or brazing.

9. The cooling air injection device according to claim 7, wherein said first metal material is selected from nickel-based alloys.

10. The cooling air injection device according to claim 7, wherein said second metal material is selected from nickel- or titanium-based alloys.

11. The cooling air injection device according to claim 7, wherein each injector is fixed to the inner and outer shrouds by a bolted connection so as to ensure a precise setting angle.

12. The cooling air injection device according to claim 7, wherein each injector presents reduced height over a length adjacent to its trailing edge so as to leave the aerodynamic throat free to expand.

13. The cooling air injection device according to claim 7, wherein said leading edge portion includes only said first metal material.

14. The cooling air injection device according to claim 7, wherein said second metal material is only included in said trailing edge portion.

15. The cooling air injection device according to claim 7, wherein only said trailing edge portion includes both said first and said second metal materials.

16. A method for making an injector for a cooling injection device comprising:
   joining a first material with a second material to form a bimetallic structure, said first material having a first second coefficient of thermal expansion, said second material having a second coefficient of thermal expansion that is smaller than the first;
   forming an injector from the bimetallic structure, said injector having,
      a leading edge portion including the first metal material, and
      a trailing edge portion including the first material and the second metal material, the second material forming a complementary portion on a suction side of the injector,
   wherein said leading edge portion is free of said second metal material.

17. The method for making an injector according to claim 16, wherein said joining includes joining said first and second metal materials together by welding or brazing.

18. The method for making an injector according to claim 16, wherein said forming includes forming said injector by electroerosion, laser cutting, or cutting said bimetallic structure with a jet of water.

19. The method for making an injector according to claim 16, wherein said first metal material is selected from nickel-based alloys.

20. The method for making an injector according to claim 16, wherein said second metal material is selected from nickel- or titanium-based alloys.

* * * * *